United States Patent
Hsieh et al.

[11] Patent Number: 6,142,499
[45] Date of Patent: Nov. 7, 2000

[54] FOOTREST ASSEMBLY OF BICYCLE

[76] Inventors: Te-Tsai Hsieh, 23 Alley 11, La. 250 Chung Hua See Rd., Chan Hua City; Chin-Feng Lin, 88 Chang An La. Show Sway Hsiang, Chan Hua Hsien, both of Taiwan

[21] Appl. No.: 09/270,064

[22] Filed: Mar. 16, 1999

[51] Int. Cl.⁷ .................................................. B62J 25/00
[52] U.S. Cl. .................. 280/291; 280/288.4; 280/304.5; 403/96; 74/564; 180/219
[58] Field of Search ................ 280/291, 288.4, 280/304.5; 180/219; 74/564; 403/157, 161, 150, 96, 93

[56] References Cited

U.S. PATENT DOCUMENTS

| | | | |
|---|---|---|---|
| 4,797,791 | 1/1989 | Burchick | 280/291 |
| 5,454,580 | 10/1995 | Lin | 280/291 |
| 5,638,723 | 6/1997 | Lin | 280/291 |
| 5,779,254 | 7/1998 | James et al. | 280/291 |
| 5,979,269 | 11/1999 | Su-Chen | 280/291 |

*Primary Examiner*—Lanna Mai
*Assistant Examiner*—Hau Phan
*Attorney, Agent, or Firm*—Bacon & Thomas, PLLC

[57] ABSTRACT

A footrest assembly of a bicycle is essentially composed of a pivoting seat, a rod, a fastening piece, an outer cover, and a plurality of C-shaped rings. The rod is fastened pivotally at one end thereof with the pivoting seat which is in turn fastened with the rear fork tip of the bicycle. The rod can be turned on a pivot of the pivoting seat so as to be parallel or perpendicular to the rear fork tip of the bicycle. The rod is fastened at other end thereof with the outer cover by the fastening piece. The outer cover is coated with a fluorescent material. The C-shaped rings are coated with the fluorescent material and fastened on the rod at an interval.

1 Claim, 3 Drawing Sheets

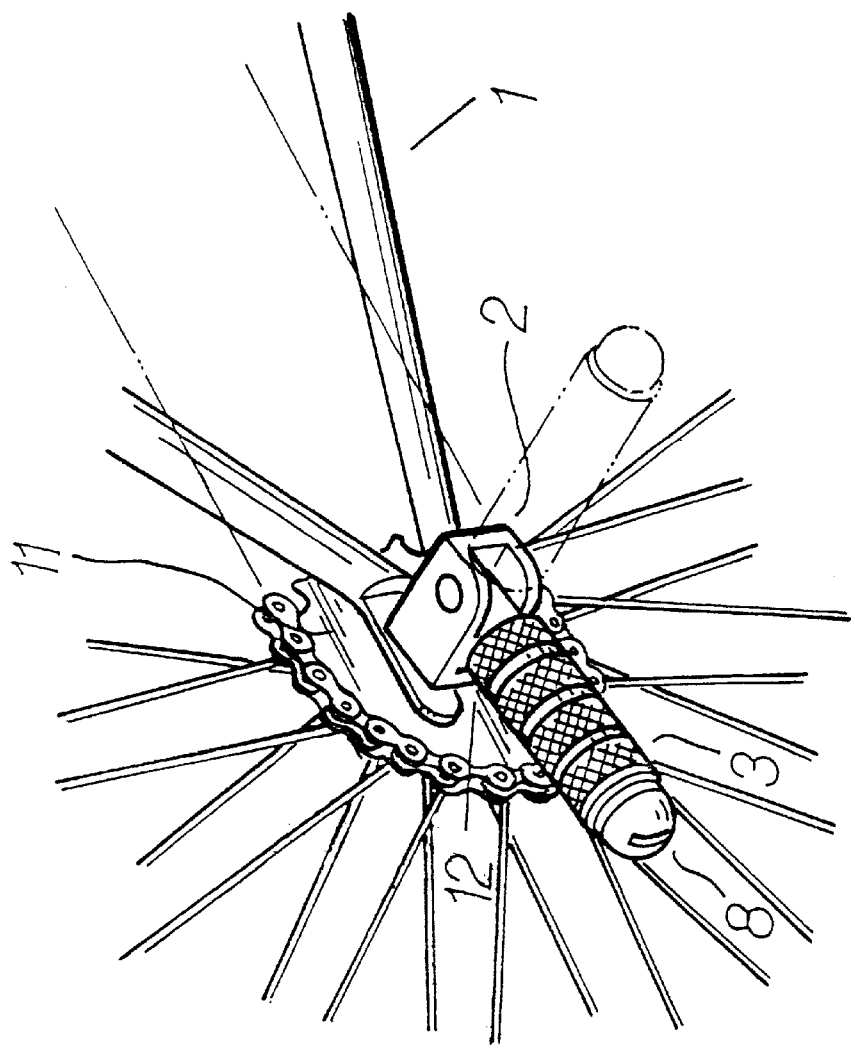
FIG.2-A

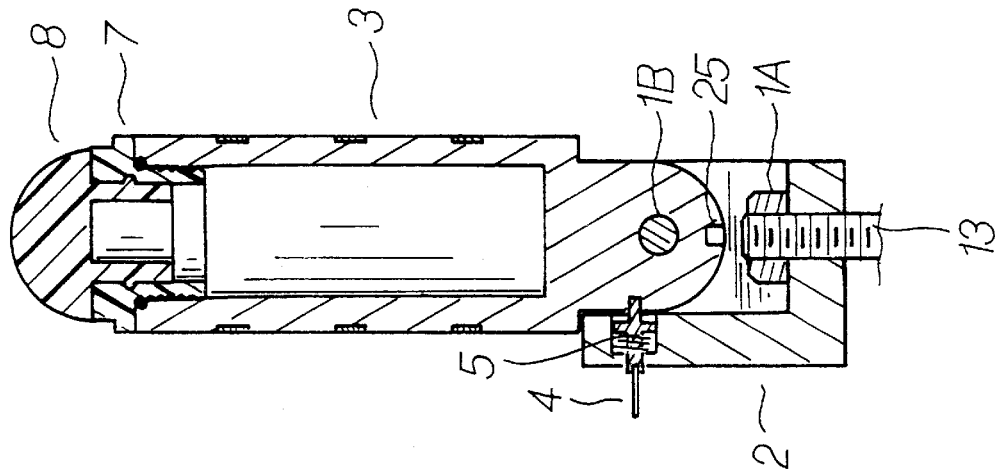
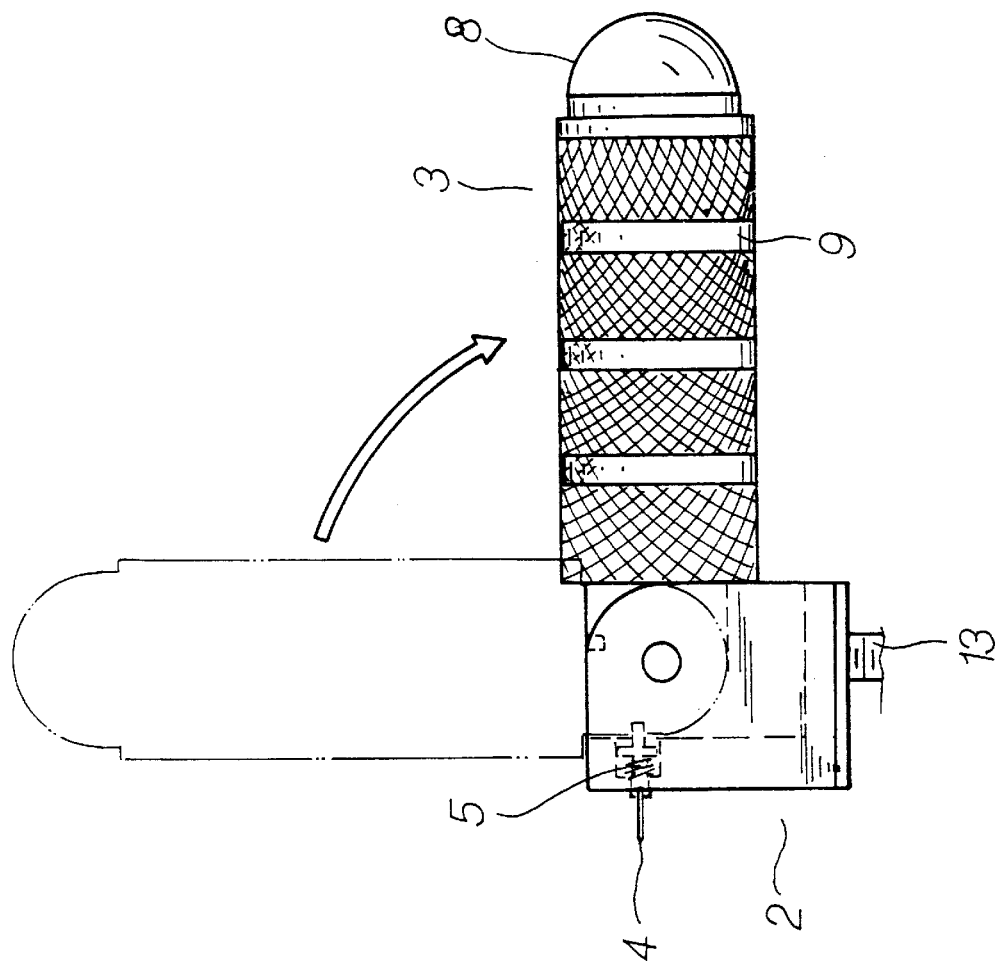

FOOTREST ASSEMBLY OF BICYCLE

FIELD OF THE INVENTION

The present invention relates generally to a bicycle, and more particularly to a footrest assembly of the bicycle. The footrest is foldable and provided with a light-reflecting means to enhance the safety of the bicycle in motion.

BACKGROUND OF THE INVENTION

The conventional footrest of bicycle is generally fastened with the bicycle frame by a plurality of fastening elements and is rather vulnerable to becoming loosened or even disengaged with the bicycle frame. In addition, the conventional footrest of bicycle is projected out from the bicycle frame such that the footrest of bicycle is not provided with a light-reflecting means to enhance the safety of a bicyclist riding the bicycle in a poorly-lit street or road.

SUMMARY OF THE INVENTION

The primary objective of the present invention is to provide a bicycle with an improved footrest free from the shortcomings of the conventional footrest described above.

In keeping the principle of the present invention, the foregoing objective of the present invention is accomplished by a footrest assembly which is composed of a pivoting seat, a rod for supporting the foot of a rider, a fastening piece, an outer cover capable of reflecting light, and a plurality of C-shaped rings which are capable of reflecting light and are fitted securely over the rod at an interval. The rod is pivotally fastened at one end thereof with the pivoting seat which is in turn fastened with the rear fork tip of a bicycle. The rod can be turned on a perpendicular to the rear fork tip. The rod is fastened at other end thereof with the outer cover by the fastening piece.

The foregoing objective, features, functions, and advantages of the present invention will be more readily understood upon a thoughtful deliberation of the following detailed description of a preferred embodiment of the present invention with reference to the accompanying drawings.

BRIEF DESCRIPTION OF THE DRAWINGS

FIG. 2A shows a schematic view of the preferred embodiment of the present invention at work.

FIG. 2B shows another schematic view of the preferred embodiment of the present sectional view of the preferred embodiment of the present invention in combination.

DETAILED DESCRIPTION OF THE EMBODIMENT

Figure 1:
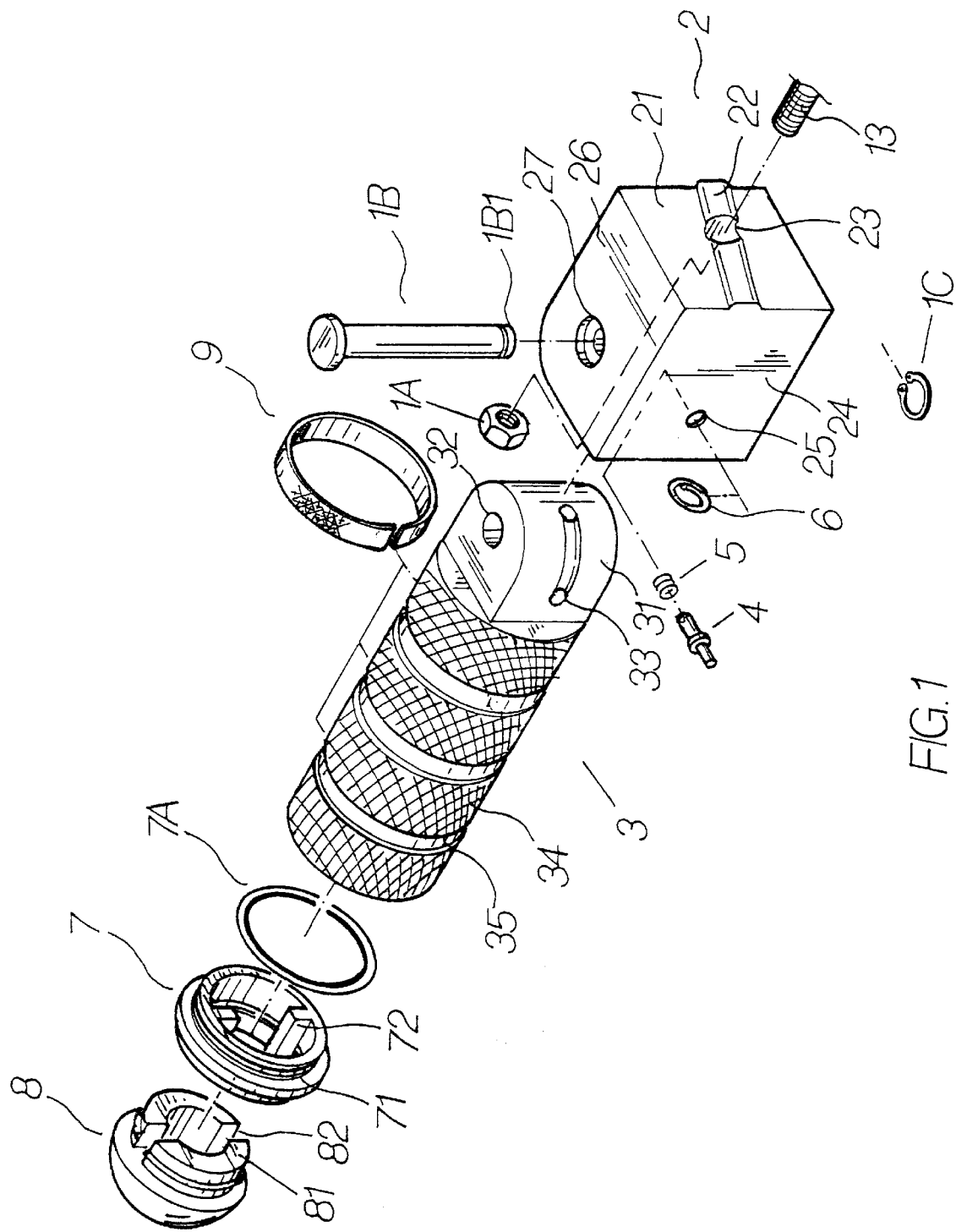
FIG. 1 shows an exploded view of the preferred embodiment of the present invention.

As shown in all drawings provided herewith, a footrest assembly of the preferred embodiment of the present invention is fastened pivotally with the rear fork tip 11 of a bicycle 1 and is composed of a pivoting seat 2, a rod 3, a fastening piece 7, an outer cover 8, and a plurality of C-shaped rings 9.

The pivoting seat 2 is provided in one side 21 thereof with a retaining portion 22 which is in turn provided with a fastening hole 23. The pivoting seat 2 is further provided in other side 24 thereof with a stepped through hole 25. The pivoting seat 2 is further provided with a pivot hole 27 extending through an upper side 26 thereof and a lower side 26 thereof. The pivoting seat 2 is fastened with the rear fork tip 11 of the bicycle frame 1 such that the retaining portion 22 of the pivoting seat 2 is retained in a retaining portion 22 of the pivoting seat 2 is retained in a retaining slot 12 of the rear fork tip 11 and that the fastening hole 23 of the pivoting seat 2 is fitted over a spindle 13 of the rear fork tip 11. The spindle 13 is engaged at one end thereof with a nut 1A for preventing the pivoting seat 2 from slipping out of the spindle 13.

The rod 3 has a predetermined length and is intended to support the foot of a person. The rod 3 has a pivoting end 31 which is provided with a pivoting hole 32 corresponding in location to the pivot hole 27 of the pivoting seat 2. The pivoting end 31 of the rod 3 is further provided with a locating slot 33. With the exception of the pivoting end 31, the rod 3 is provided in the outer surface thereof with a plurality of ring retaining slots 35 which are arranged at an interval. Located between the two ring retaining slots 35 is an embossed portion 34 for providing friction. The rod 3 is fastened pivotally with the pivoting seat 2 by a pivot 1B which is received in the pivot hole 27 of the pivoting seat 2 and the pivoting hole 32 of the rod 3. The pivot 1B is provided at one end thereof with a retaining groove 1B1. The one end of the pivot 1B is jutted out of the underside 26 of the pivoting seat 2 such that a C-shaped retaining ring 1C is retained in the retaining groove 1B1 of the pivot 1B. A locating bolt 5, which is fitted into a spring 4, is located in the locating slot 33 via the stepped through hole 25 of the pivoting seat 2. The locating bolt 5 is securely located in the stepped through hole 25 by means of an O ring 6.

The fastening piece 7 is provided with outer threads 71 and a protrusion 72. The fastening piece 7 is fastened with the free end of the rod 3 in conjunction with a washer 7A such that the outer threads 71 of the fastening piece 7 are engaged with inner threads (not shown in the drawing) of the free end of the rod 3.

The outer cover 8 is provided with a retaining slot 82 corresponding in location to the protrusion 72 of the fastening piece 7, and a protruded edge 81. The outer cover 8 is fastened with the fastening piece 7 such that the retaining slot 82 retains the protrusion 72 of the fastening piece 7, and sthat the protruded edge 81 is retained by the fastening piece 7. The outer cover 8 is coated with a fluorescent material.

Each of a plurality of C-shaped rings 9 is coated with a fluorescent material and is retained in the retaining slot 35 of the rod 3.

The rod 3 is thus provided with a light-reflecting effect, thanks to the outer cover 8 and the C-shaped rings 9.

The rod 3 can the be turned on the pivot 1B such that the rod 3 is either parallel or perpendicular to the rear fork tip 11 of the bicycle 1, as shown in FIGS. 2A and 2B.

The rod 3 has a hollow interior in which small hand tools can be kept. These small hand tools will prove to be handy in the event that the bicycle is in need of a do-it-yourself (DIY) repair work.

The embodiment of the present invention described above is to be regarded in all respects as being merely illustrative and not restrictive. Accordingly, the present invention may be embodied in other specific forms without deviating from the spirit thereof. The present invention is therefor to be limited only by the scope of the following appended claim.

What is claimed is:

1. A footrest assembly of a bicycle, said footrest assembly comprising:

a pivoting seat provided in one side thereof with a retaining portion which is in turn provided with a fastening hole, said pivoting seat provided in other side thereof with a stepped through hole, said pivoting seat further provided with a pivot hole extending through an upper side thereof and a lower side thereof, said pivoting seat being fastened with a rear fork tip of the bicycle such that said retaining portion of said pivoting seat is retained in a retaining slot of the rear fork tip, and that said fastening hole of said pivoting seat is fitted over a spindle of the rear fork tip;

a rod for supporting the foot of a person and provided at a pivoting end thereof with a pivoting hole corresponding in location to said pivot hole of said pivoting seat, said pivoting end provided with a locating slot, said rod further provided in an outer surface thereof with a plurality of ring-retaining slots and embossed portions, with each embossed portion being located between two of said ring-retaining slots, said rod being fastened at said pivoting end thereof with said pivoting seat by a pivot which is received in said pivot hole of said pivoting seat and said pivoting hole of said pivoting end of said rod, said rod being located by a locating bolt in conjunction with a spring such that said locating bolt is located in said locating slot of said pivoting end of said rod via said stepped through hole of said pivoting seat;

a fastening piece provided with outer threads and a protrusion and fastened with a free end of said rod such that said outer threads are engaged with inner threads of said free end of said rod;

an outer cover provided with a retaining slot corresponding in location to said protrusion of said fastening piece, and a protruded edge, said outer cover being fastened with said fastening piece in such a way that said retaining slot of said outer cover retains said protrusion of said fastening piece, said outer cover being coated with a fluorescent material; and a plurality of C-shaped rings each being retained in one of said ring-retaining slots of said rod, said C-shaped rings being coated with a fluorescent material.

\* \* \* \* \*